United States Patent
Gubbins

(10) Patent No.: US 11,410,698 B1
(45) Date of Patent: Aug. 9, 2022

(54) SLIDING DISK DRIVE RECORDING HEAD WITH WIRELESS POWER AND DATA INTERFACES

(71) Applicant: Seagate Technology LLC, Fremont, CA (US)

(72) Inventor: Mark Anthony Gubbins, Donegal (IE)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/230,396

(22) Filed: Apr. 14, 2021

(51) Int. Cl.
| G11B 11/105 | (2006.01) |
| G11B 13/04 | (2006.01) |
| G11B 5/00 | (2006.01) |
| G11B 5/60 | (2006.01) |
| G11B 5/48 | (2006.01) |
| G11B 5/54 | (2006.01) |

(52) U.S. Cl.
CPC ............ *G11B 13/04* (2013.01); *G11B 5/4813* (2013.01); *G11B 5/4866* (2013.01); *G11B 5/54* (2013.01); *G11B 5/6088* (2013.01); *G11B 11/105* (2013.01); *G11B 2005/0021* (2013.01)

(58) Field of Classification Search
None
See application file for complete search history.

(56) References Cited

U.S. PATENT DOCUMENTS

| 4,972,396 | A | | 11/1990 | Rafner | |
| 5,519,554 | A | | 5/1996 | Todd et al. | |
| 5,729,408 | A | | 3/1998 | Kikitsu | |
| 6,078,471 | A | * | 6/2000 | Fiske | G11B 5/4886 360/234.4 |
| 6,078,476 | A | * | 6/2000 | Magee | G11B 5/5552 360/294.3 |
| 7,146,623 | B2 | | 12/2006 | Kuwajima et al. | |
| 8,693,126 | B2 | | 4/2014 | Buckholdt et al. | |
| 2002/0097520 | A1 | * | 7/2002 | Bower | G11B 5/5526 360/78.12 |
| 2005/0146807 | A1 | * | 7/2005 | Huang | G11B 5/5552 360/78.05 |
| 2005/0207067 | A1 | * | 9/2005 | Zabtcioglu | G11B 5/012 360/266.2 |
| 2010/0053788 | A1 | * | 3/2010 | Uno | G11B 5/6005 360/31 |
| 2012/0327529 | A1 | * | 12/2012 | Hutchinson | G11B 5/607 360/31 |

(Continued)

OTHER PUBLICATIONS

Dinulovic et al., "Integrated Electromagnetic Second Stage Microactuator for a Hard Disk Recording Head", IEEE Transactions on Magnetics, vol. 44, No. 11, Nov. 2008, pp. 3730-3733.

(Continued)

*Primary Examiner* — Tan X Dinh
(74) *Attorney, Agent, or Firm* — Mueting Raasch Group

(57) ABSTRACT

A disk drive has a recording head slidably coupled to a rail and in magnetic communication with a disk surface. The recording head has an optical power interface and an optical data interface. An optical transceiver is fixably mounted proximate an end of the rail and optically coupled to the optical power interface and/or the optical data interface of the recording head. The coupling between the optical transceiver and the interfaces facilitates writing data to the disk surface and/or reading data from the disk surface via the recording head.

20 Claims, 6 Drawing Sheets

(56) References Cited

U.S. PATENT DOCUMENTS

2013/0142020 A1* 6/2013 Rawat ............... G11B 5/314
369/13.33
2013/0170331 A1* 7/2013 Contreras ............ G11B 5/607
369/13.33

OTHER PUBLICATIONS

Gatzen et al., "A Slider With an Integrated Microactuator (SLIM) for Second Stage Actuation in Hard Disc Drives", IEEE Transactions on Magnetics, vol. 44, No. 11, Nov. 2008, pp. 3726-3729.
Merzouk et al., "Highly compact and easy-to-use optical chip interferometer with picometric performances", Review of Scientific Instruments, vol. 87, 2016, 7 pages.
Ruhfert et al., "Magnetic Levitation Assisted Guide for a Linear Micro-Actuator", IEEE Transactions on Magnetics, vol. 42, No. 11, Nov. 2006, pp. 3785-3787.
Ruhfert et al., "Design and Technology of a Magnetic Levitation System for Linear Micro Actuators", Proceedings of the ASME 2007 International Design Engineering Technical Conferences & Computers and Information in Engineering Conference, Sep. 4-7, 2007, 6 pages.
Ruhfert et al., "Slider with Integrated Microactuator (SLIM) for Second Stage Actuation in Hard Disk Drives", Design and Manufacturing of Active Microsystems, 2011, 3 pages.

* cited by examiner

SLIDING DISK DRIVE RECORDING HEAD WITH WIRELESS POWER AND DATA INTERFACES

SUMMARY

The present disclosure is directed to a linearly-driven, disk drive recording head with wireless power and data interfaces. In one embodiment, a disk drive includes a rail extending from an inner diameter to an outer diameter of a disk surface. A recording head slidably is coupled to the rail and in magnetic communication with the disk surface. The recording head has an optical power interface and an optical data interface. An optical transceiver fixably mounted proximate an end of the rail and optically coupled to one or both of the optical power interface and the optical data interface of the recording head, thereby facilitating one or both of writing data to the disk surface and reading data from the disk surface via the recording head.

In another embodiment, a method involves optically and wirelessly powering a recording head that is positioned over a spinning magnetic disk. Commands are optically and wirelessly communicated with the recording head to cause the recording head to perform one or both of writing data to reading data from the spinning magnetic disk. In response to the commands, the recording head to moves along a rail that is in magnetic communication with the recording head to position the recording head over tracks of the spinning magnetic disk to perform one or both of the writing and the reading.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
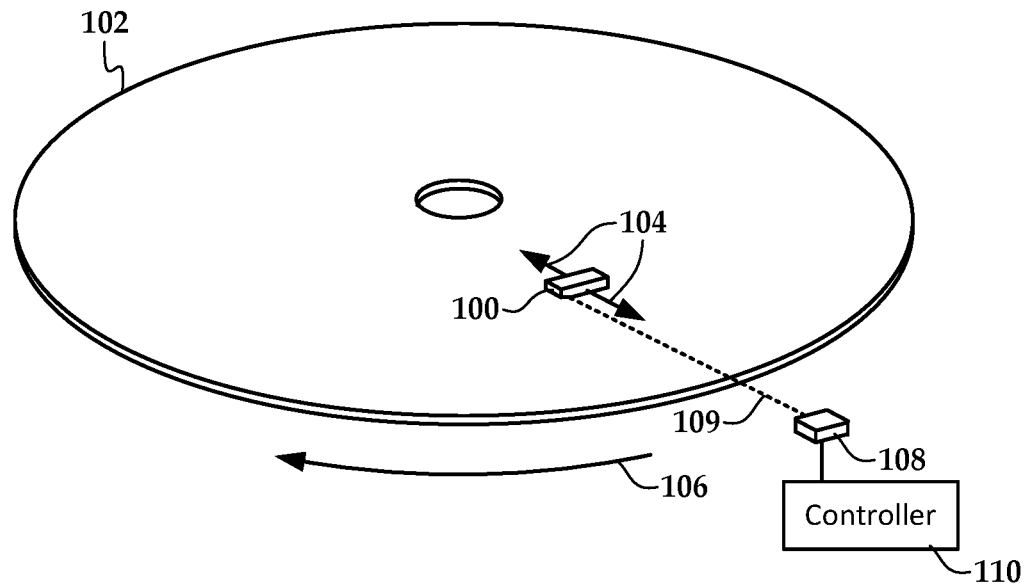
FIGS. 1, 2, and 3 are perspective, plan, and side views of hard drive components according to an example embodiment.

The present disclosure is generally related to hard disk drive (HDD) data storage devices. These devices incorporate one or more magnetic disks or platters with a magnetic coating on at least one side, usually on both sides. A read/write head rides over the surface, typically separated by a thin layer of air. The read/write head includes magnetic write transducers for converting electrical signals to magnetic fields and magnetic read transducers for converting magnetic fields to electrical signals. Traditionally there has been one read/write head per disk surface, although some configurations have been developed for more than one read/write head per disk surface.

Traditionally, disk drives have mounted the read/write heads to the ends of arms that are rotated about a pivot. A rotary actuator, often referred to as a voice coil motor (VCM), moves the arms together across the different surfaces of the disks. A VCM driven arm can quickly move the heads to different tracks, known as seeking, during read and write operations. A smaller actuator at the end of the arm, often referred to as a microactuator, can provide fine adjustments of the read/write head location, e.g., to ensure the head remains over the track during track-following operations.

While other data storage technologies such as solid-state drives (SSD) may offer superior read/write throughput compared to HDD, SSD is still significantly more expensive per unit of data stored than HDD. For some applications, e.g., large data centers, HDDs will still be needed in the foreseeable future in order to handle ever-increasing data storage requirements. Therefore, there is value in advancing HDD technologies that can keep the cost down but improve throughput and data storage density.

One way of increasing HDD performance is to increase the number of heads per disk surface. This can increase throughput performance, as the heads can operate in parallel in a number of ways. For example, for a single sequential read, the multiple heads could read simultaneously different tracks that are all part of the read request, thus decreasing the time to service the request in proportion to the number of heads that can simultaneously access the surface. In another example, the different heads could simultaneously service different read and/or write requests, which can lower the latency that would otherwise occur if the requests were serviced by a single head that needed to seek across the surface to fulfill the requests in series.

Using a traditional VCM driven actuator, one way of having two heads per disk surface are to use two or more actuators, e.g., located at different pivot points. While this can necessitate an increase the size of the enclosure to accommodate an additional VCM, this can provide parallel access of disk surfaces using long-established technology. However, multiple actuators per surface present a significant cost challenge for hard drives. Multiple actuators can also increase power consumption, which is counter to the trend in data centers to decrease operating power to enable more densely packing devices into racks. Also, frequency bandwidth limitations may start to affect recording performance as high frequency signals are transmitted to the head. These penalties can increase in proportion to the number of heads per surface. For example, to use four heads per surface, four VCMs would be deployed around the disk, which would incur significant increases in cost, weight, and power consumption.

In FIG. 1, a diagram illustrates some concepts that can be used in a disk drive according to various embodiments described below. A read/write head 100 is shown over a disk 102. The read/write head 100 may be a single function head, e.g., read or write only, and it will be understood that the term head, read/write head, read head, write head, recording head, slider, etc., can be used interchangeably without affecting the scope of the disclosed embodiments.

In a traditional HDD, the head is move across the surface in an arc. In the example shown in FIG. 1, the head 100 is linearly actuated across the surface of the disk (as indicated by arrows 104) while the disk 102 rotates underneath (as indicated by arrow 106). While specific structure for moving the head 100 are described below, the linear actuation allows multiple heads on each disk surface with minimal cost and drive volume issues.

In a traditional HDD, the head is coupled to drive circuitry (e.g., preamplifier, system controller) via conductive traces (e.g., flexible ribbon cable) that run along the arm and are coupled to the drive electronics via connectors. In the example shown in FIG. 1, the head 100 is optically coupled to an optical transceiver 108 via optical link 109, which in turn is coupled to the drive electronics, such as controller 110. Note that multiple optical links may be used, e.g., one for power, one for read channel, one for write channel, etc. Optical communication between the head 100 and drive electronics 108, 110 removes significant bandwidth limitations on recording.

A disk drive can utilize the features shown in FIG. 1 through the use of low cost lasers and photonic circuits that have been developed for other purposes in disk drives. For example, heat-assisted magnetic recording (HAMR) uses a laser on the read/write head to heat the recording medium while a magnetic field is being applied, which significantly increases the areal density capability of the recording medium. These small but powerful lasers can be inexpensively integrated into the heads, and this capability can be expanded to enable wireless communications with the heads 100.

Another technological development that enables the features shown in FIG. 1 is the ability to integrate preamplifier electronics on the recording head. While the preamplifier electronics are traditionally located on the drive main board, a number of increasing complex circuits have been integrated into recording heads for purposes such as clearance control and detection, HAMR laser control, MAMR, and other advanced magnetic recording technologies. Increasingly sophisticated manufacturing techniques in both silicon-based electronics and integrated photonics can enable manufacturing preamplifiers and optical transducers at the scale needed to be integrated with a recording head.

Another technology that can enable the features shown in FIG. 1 is the magnetic actuation of the recording head 100 over the disk 102. While linear motors have been widely used in optical drives and other devices, these are not widely used in hard disk drives. While it may be challenging for a linear drive to obtain seek speeds that compete with a VCM, this can be alleviated by the use of multiple heads per surface, such that the required seek range for an individual head is only a fraction of the entire range (e.g., outer diameter minus the inner diameter). Technologies such as micro-electromechanical manufacturing system (MEMS) can enable linear actuation systems for moving the head 100 over the disk 102

Figure 2:
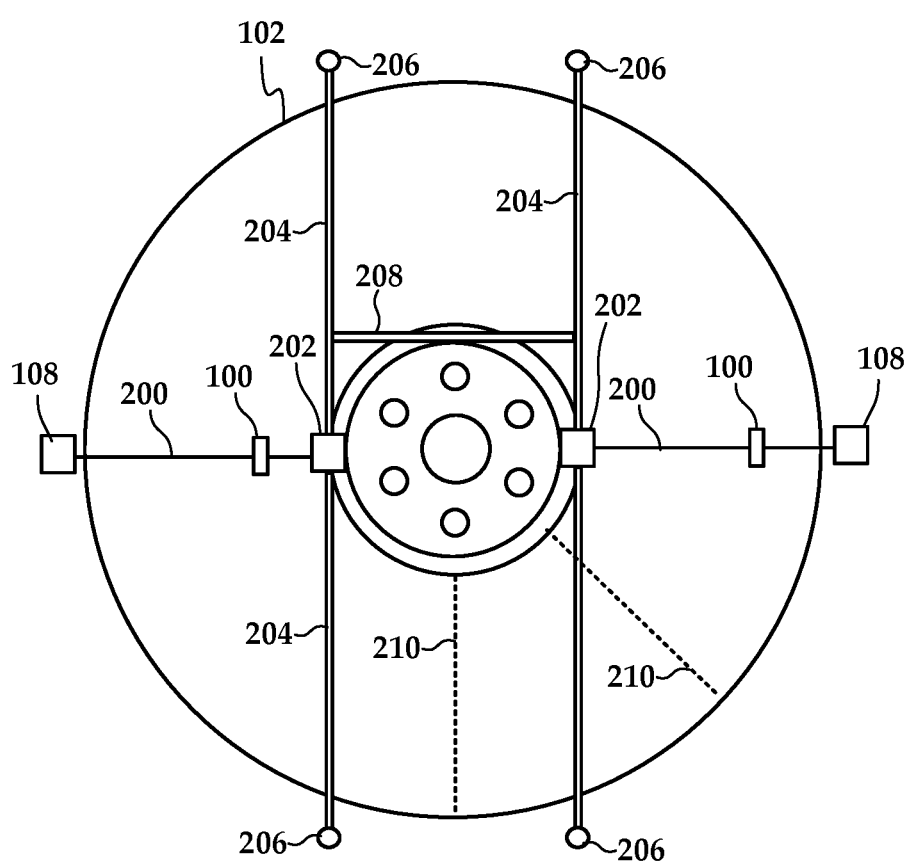

In FIG. 2, a diagram shows additional details of a drive according to an example embodiment. In this view, two heads 100 are shown over the disk 102. Each head 100 moves along a respective rail 200 that runs between an inner diameter and an outer diameter of the disk 102. The rails 200 are at different angular locations from one another, offset from each other by 180° in this view; however other angular offsets are possible. The rails 200 provide physical support for the heads 100, and together form a linear actuator interface. Note that the illustrated rails 200 are linear and extend from a center of the disk 102 to the outer diameter 180 degrees apart from one another. Some embodiments may include other orientations than what is shown, e.g., two or more rails at an angle to one another that is less than 180 degrees as indicated by dashed lines 210 which may represent alternate or additional rail locations. In addition to the optical transceiver 108 near the outer diameter of the disk 102 that was shown in FIG. 1, a second optical transceiver 202 is shown in this view near the inner diameter of the disk 102. The second optical transceiver 202 may cantilevered at the end of the rail 200, or may be supported near the inner diameter by a fixed or bearing interface, the latter riding on a moving surface of the disk.

Generally, the inner optical transceiver 202 may be coupled to an electrical line in order to provide power and to send and receive signals from the controller 110. In this figure, one or more support arms 204 may extend from the inner optical transceiver 202 to outside the disk 102, where the support arms 204 are coupled to posts 206. The posts 206 extend vertically out of the page and could support multiple support arms 204, one for each pair of disk surfaces, for example. Such a support arrangement could also have addition support structures, such as crossbar 208. Such a crossbar 208 could also be used to support an additional inner optical transceiver 202, e.g., for a third rail (not shown) that extends vertically from the center of crossbar 208 and is offset by 90° from the other rails.

Figure 3:
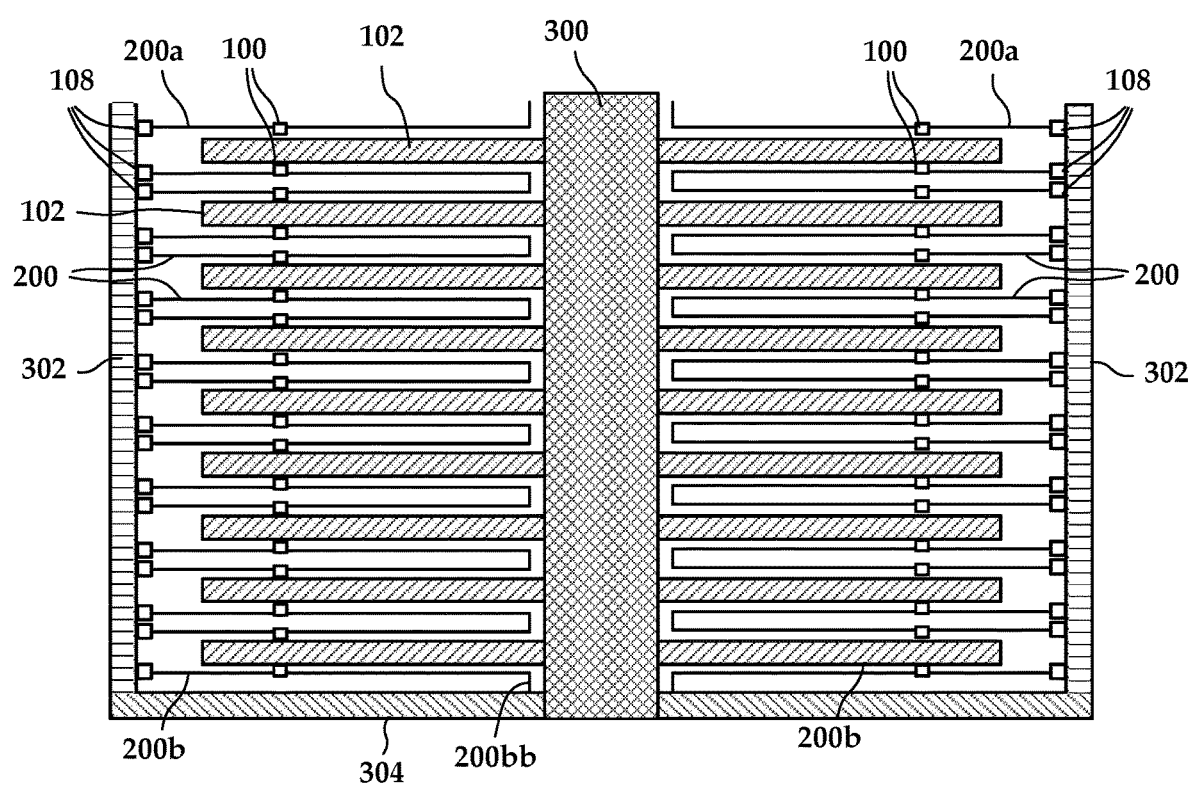

While this embodiment shows two rails 200 per surface, there may be more or fewer rails per surface. Similarly, although there is one head 100 shown per rail 200, there may be more than one head 100 per rail. Where more than two stacked disks 102 are used, two rails 200 may be located between each facing disk surface. This can be seen in FIG. 3, which is a side view showing additional details of a drive according to an example embodiment. In this embodiment, ten disks 102 are shown stacked, driven by a common spindle 300. A spindle motor (not shown) is connected to the spindle 300 and rotates the disks 102.

On the topmost and bottommost surfaces, two rails 200 are shown, e.g., top rails 200a and bottom rails 200b. The ends of these rails 200a, 200b near the inner diameter of the disks 102 may be fixably attached to the drive structure, e.g., as shown by end 200bb of rail 200b which is supported by the base deck 304 of the drive. In this example, an outer diameter optical transceiver 108 is near the outer diameter end of each rail 200. An inner diameter transceiver (e.g., optical transceiver 202 shown in FIG. 2) may be used as well, although is not shown in this figure. The ends of the rails 200 (except possibly for top and bottom rails 200a, 200b) are unattached near the disk inner diameter in this example, such that the rails 200 are cantilevered from vertical supports 302. The vertical supports 302 may also include power and signal lines that couple the optical transceivers 108 to a main board (not shown).

Figure 4:
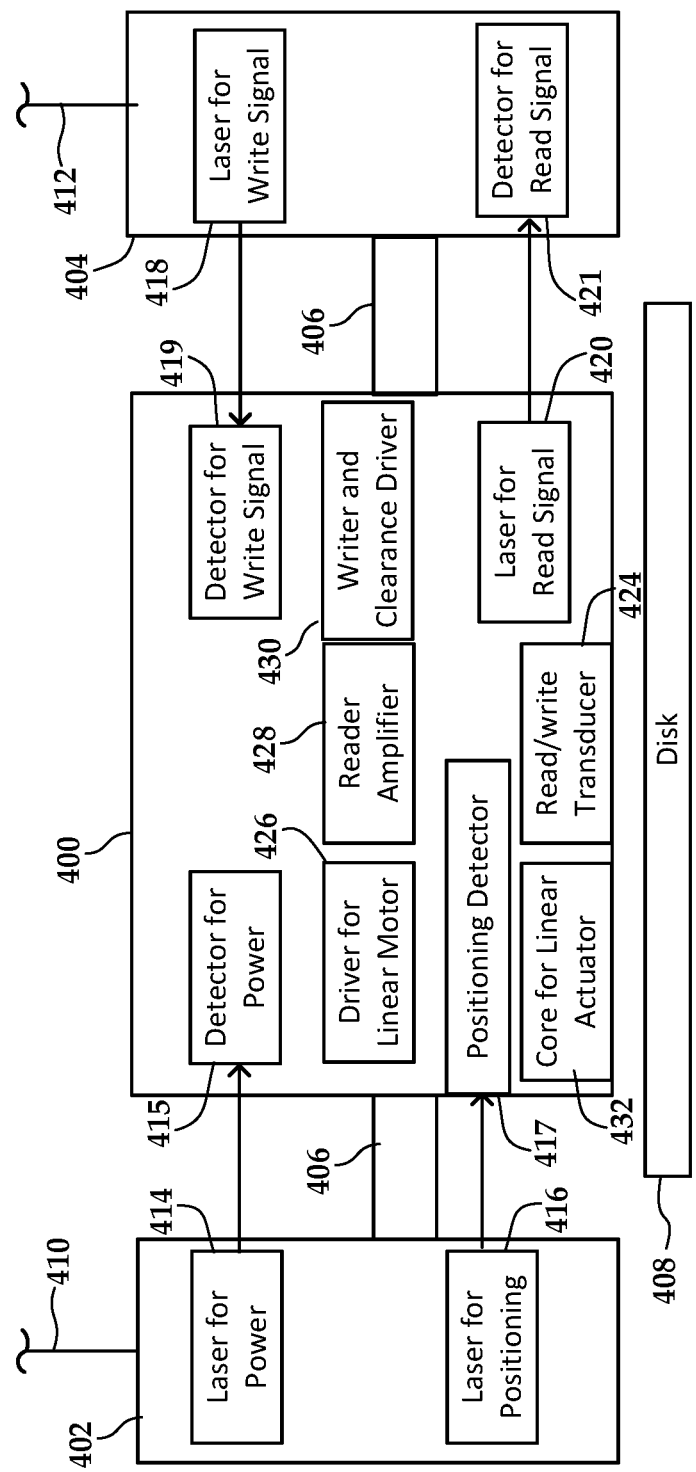
FIG. 4 is a block diagram of drive components according to an example embodiment.

In FIG. 4, a block diagram shows functional components of a disk drive according to an example embodiment. In this example, a recording head 400 is shown in wireless communication with transceivers 402, 404. The recording head 400 is physically supported by a rail 406 that suspends the head 400 over a disk 408. The transceivers 402, 404 are located at distal ends of the rail 406, e.g., similar to transceivers 108 and 202 shown in FIG. 2. As indicated by data lines 410 and 412, the transceivers 402, 404 are in communication with drive circuitry, e.g., controller board, system-on-a-chip (SoC), etc.

The recording head 400 and transceivers 402, 404 each include at least one light emitter (e.g., a laser diode) and one light detector (e.g., photodiode, photovoltaic cell). For example, transceiver 402 includes a power laser 414 that illuminates a power detector 415 on the recording head 400. The power detector 415 may include a converter such as a photovoltaic cell that coverts the received light energy to electrical power for use by electronic components of the recording head 400. Generally, the power detector 415 serves as an optical power interface of the recording head 400.

The transceiver 402 also includes a positioning laser 416 that illuminates a positioning detector 417 on the recording head 400. The light emitted from the positioning laser 416 may include encoded data that commands or assists the recording head 400 in seeking to and holding a position (e.g., track location), and may include data associated with servo control on conventional hard disk drives. The other transceiver 404 includes a write signal laser 418 that illuminates a write signal detector 419 on the recording head 400. The light emitted from the write signal laser 418 includes at least encoded user data that the recording head 400 writes to the disk 408 via read/write transceiver 424.

The recording head 400 includes its own laser, in this case a read signal laser 420 that illuminates a read signal detector 417 on the transceiver 402. The light emitted from the read signal laser 418 includes at least encoded user data that the recording head 400 reads from the disk 408 via read/write transceiver 424. The read/write transducer 424 may include its own laser, e.g., a HAMR laser for heating the disk 408 while recording data.

Generally, the read signal laser 420, write signal detector 419, and positioning detector 417 serve as an optical data interface for the recording head 400. Note that in some embodiments, the optical data interface use fewer detectors. For example, the data from writing and positioning could be multiplexed into a single signal that can be de-multiplexed at the recording head 400 after being converted from optical to electronic signals. Also, data signals could be "piggybacked" on the power laser beam, such that data could be recovered from the photovoltaic cell. In another embodiment, the optical beam could be split such that a specialized photodetector receives a portion of the beam and decodes data therefrom.

In addition to the lasers and detectors, the recording head 400 may include additional processing circuitry not normally associated with conventional recording heads. For example, a linear motor driver 426 provides signals used to position the recording head 400 along the rail 406, e.g., pulses applied to magnetic coils. A read amplifier 428 receives and conditions signals received from a reader (e.g., magnetoresistive sensor) in the read/write transducer 424. The read amplifier 428 amplifies and sends these signals via the read signal laser 420, which communicates the read signals to a read signal detector 421. A writer and clearance driver 430 manages a clearance actuator (e.g., a heater, not shown) that provide fine control of clearance between the read/write transducer 424 and the disk 408. The core 432 for the linear actuator is an electromagnetic component that provides motive force to move the recording head 400 along the rail. The writer and clearance driver 430 also includes a write amplifier that amplifies write signals which may be applied at least to a magnetic write coil, and optionally to a HAMR laser.

In some embodiments, the rail-to-head interface can use a MEMs based linear actuator and electronic driver on head to actuate slider on arm. The slider could levitate and will move on arm with low friction. The rail-to-head interface may include a mechanical feature (e.g., a tab extending from the head that rides within a slot on the rail) to ensure the head does not separate from the rail upon loss of power. In order to simplify the design, the data and power are provided to the recording head wirelessly, e.g., via far-field optical coupling.

Figure 5:
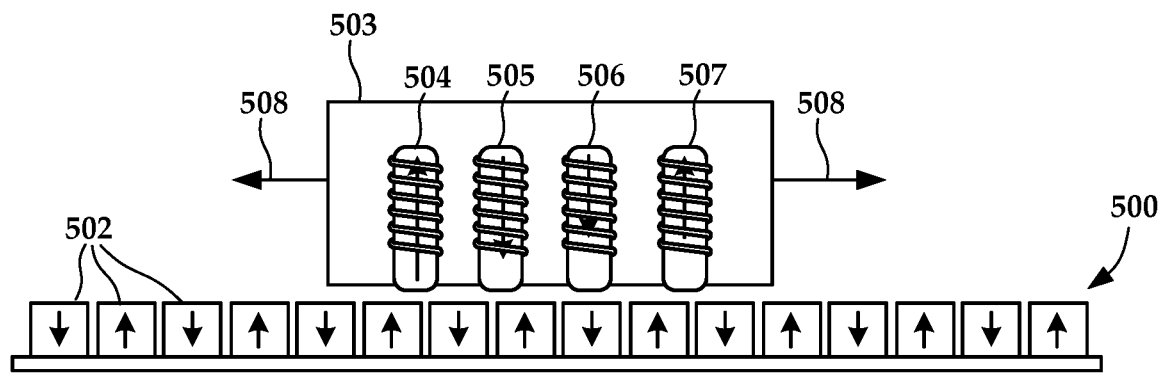
FIGS. 5 and 6 are diagrams showing details of a linear drive according to example embodiments.

In FIG. 5, a diagram shows an example of a linear drive that can be used to move a recording head according to an example embodiment. A rail 500 includes a series of permanent magnets 502 along its length, each magnet 502 having a different field orientation than the magnets 502 on either side. A recording head 503 (or a structure attached to the recording head 503) includes magnetic cores 504-507 that are individually activated using different magnitudes and directions of current as indicated by the arrows. Note that more or fewer cores could be used than what is shown.

The currents applied to the ores 504-507 are timed to move the recording head 503 along the rail 500, as indicated by arrows 508. Note that some variations on this embodiment may include using a fixed magnetic pattern on the disk (not shown) in place of the magnets 502. In such an example, the timing of the current applied to the cores 504-507 would be synchronized with the timing of the pattern during the disk rotation.

Figure 6:
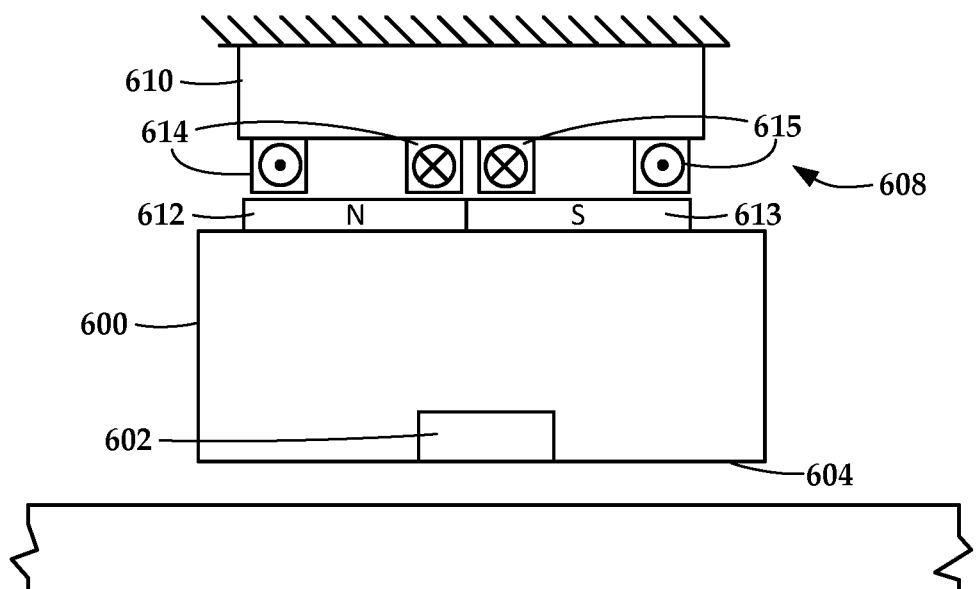

In FIG. 6, a block diagram shows details of a linear drive that can be used to move a recording head according to another example embodiment. A recording head 600 includes read/write transducers 602 at an air-bearing surface (ABS) 604. The recording head 600 is moved over a disk 606 via a MEMS actuator 608. In this example, the actuator 608 includes permanent magnets 612, 613 attached to the recording head 600 and electromagnets 614, 615 attached to a rail 610. The permanent magnets 612, 613 and electromagnets 614, 615 create a repulsive force that presses the recording head 600 against an air bearing that is between the ABS 604 and the disk 606. The use of electromagnets 614, 615 allows the force to be variable, and can be used to control the spacing between the head 600 and the disk 606.

The arrangement shown in FIG. 6 can be used to support a recording head above a linear slide while an arrangement as shown in FIG. 5 can be used to position the recording head along the slide. The linear actuator features (e.g., magnets 612, 613, cores 504-507) may be implemented without an increase in recording head size compared to existing designs. In some studies, a linear slide as shown in FIG. 6 was able levitate a traveler similar to the recording head 600 using about 300 mA at 1.3 ohms, which consumes 117 mW of power. Less power is expected to be needed to move the recording head along the rail. Thus the power to move one head is estimated to be under 0.2 W, versus and estimated 1 W per head in a conventional HDD using a VCM.

Note that MEMS technologies have been implemented in sliders for other purposes, and so this demonstrates that the implementation shown in FIGS. 5 and 6 may be similarly feasible. For example, MEMS microactuators have been demonstrated that can provide a second stage of actuation on a VCM-driven recording head. In such an arrangement, the VCM provides coarse positioning, e.g., during seeks, and the second stage microactuator provides fine positioning, e.g., during track following. The manufacturing techniques for forming micro-magnetics in those applications can be applied to a linear actuator.

The integration of functions into the recording head, e.g., as shown in FIG. 4, may lead to changes in recording head and slider manufacturing processes in order to incorporate these increasingly complex circuits. These circuits may be implemented as add-on modules to a recording head, as shown in the example embodiment of FIG. 7. A recording head 700 is shown that includes components currently integrated in conventional recording heads, such as a write transducer 701 (e.g., write coil and poles) and a read transducer 702 (e.g., magnetoresistive stack). Other components may also be integrated into the recording head 700 that are not shown here, such as HAMR laser, clearance heaters, clearance detectors, etc.

The recording head 700 is supported by a rail 704 and moved in and out of the plane of the page by a linear actuator 706. A disk (not shown) moves under an air-bearing surface 703 of the recording head 700 in a left-to-right direction as seen in this view. The linear actuator 706 may use MEMS components as previously described. There may be other structural components that couple the recording head 700 to the linear actuator 706 that are not shown in this figure, such as a flexible gimbal.

The read and write transducers 701, 702 are located near a trailing edge 708 of the recording head 700, and this may be a convenient location to route electrical connections to couple signals from/to the read and write transducers 701, 702. As seen in this view, electrical lines 710 may run from the trailing edge 708 to an electro-optical module 712 on one side of the recording head 700. The electro-optical module 712 includes photodetectors 714, 715 that are configured to receive optical signals from an optical transceiver (e.g., transceiver 108 in FIGS. 1-3). The electro-optical module 712 may also include circuitry as shown by various functions within the recording head block 400 of FIG. 4.

Figure 7:
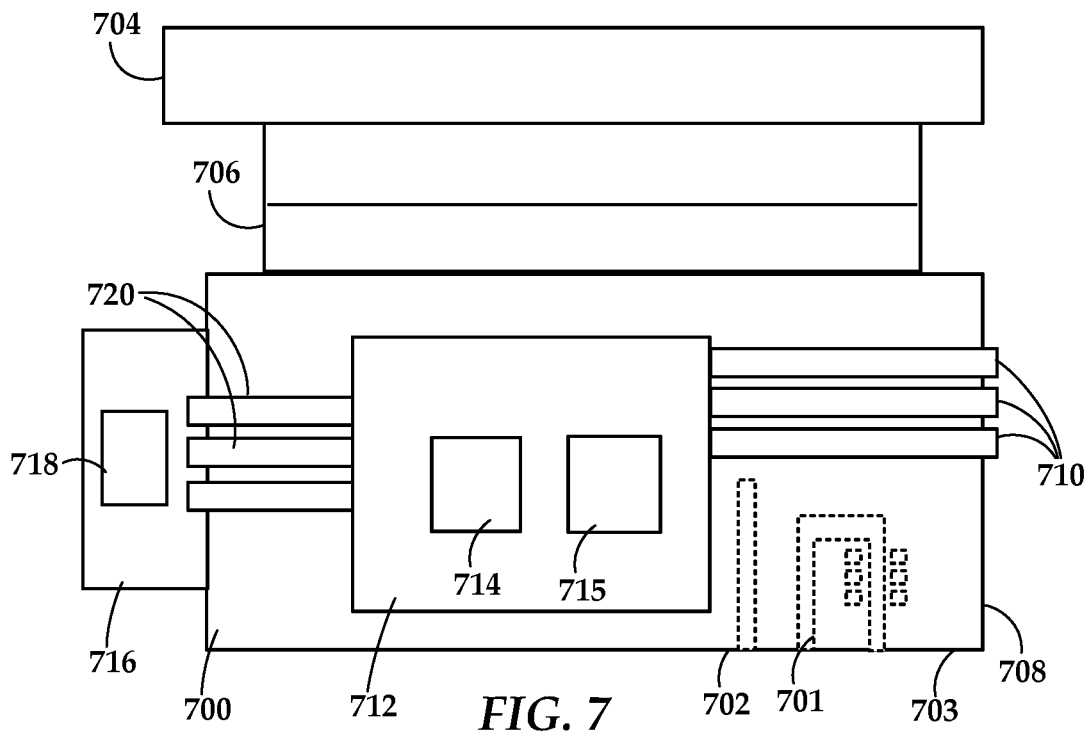
FIG. 7 is a diagram showing external components attached to a recording head according to an example embodiment.

Also seen in FIG. 7 is a leading edge mounted laser 716. The laser 716 has an output facet 718 from which the laser 716 emits light to a transceiver (e.g., transceiver 108 in FIGS. 1-3). The laser 716 may be powered and controlled via the electro-optical module 712, as indicated by conductive traces 720. Note that these locations are provided for purposes of illustration and not of limitation, and other locations can be used for the laser 716 and/or electro-optical module 712. The laser 716 and electro-optical module 712 collectively serve as an optical power interface and an optical data interface of the recording head 700. Some functions of laser 716 and/or electro-optical module 712 may be integrated directly into the recording head 700, and more than one laser 716 and/or electro-optical module 712 may be used.

The laser 716 and electro-optical module 712 may be attached using techniques similar to those used to attach lasers for HAMR sliders. For example, a pick-and-place type assembly may be used to attach the outside components to the head at bar level or slider level assemblies. In other embodiments, a transfer printing process may be used for mass attachment of components at a wafer level, assuming the attachment surfaces of the recording head 700 are exposed on the wafer.

Among the functions provided by recording head 700 and electro-optical module 712 are that of a write amplifier, read amplifier, positioning system, power transmission to the recording head 700, and remote data transmission to and from the recording head 700. It is expected that all of this functionality can be integrated into the head without significant increase in slider size. For example, a laser of about 250 μm by 35 μm fits on current HAMR recording heads, which are on the order of 800 μm×200 μm in size. Transmitting lasers in optical communications operate at powers below 5 mW, which less than 36 mW drawn by a HAMR laser. Therefore the illustrated laser 716, which would have lower power requirements, could also fit, adding some space for amplifier, modulator etc. The photodetectors 714, 715 can be smaller than laser 716 and can fit within or about the recording head 700. The optical receivers in optical communications operate at powers similar the lasers in the same applications, e.g., below 5 mW. Generally optical communications industry transmits power at power levels of pico-Joule/bit which is more efficient than nanoJoule/bit in conventional HDDs.

In conventional drives, an integrated reader amplifier has been demonstrated. In these embodiments, other elements such as coupling capacitors may also be included on the head, and capacitors have previously been implemented in heads. Current write driver electronics may be too large to fit within the recording head but might fit on the recording head as shown, or on a nearby attachment to the linear actuator. Also, because the signal path from transceiver to writer is significantly shorter than the conventional path from main board to write via flex circuit cables, the driver electronics may be more compact in the illustrated embodiments.

The power consumption for reader amplifier and writer driver is expected to be less than current preamp circuitry as analog signal does not need to be driven along the trace gimbal assembly (TGA) and flex circuit cables. The slider body and disk are expected to provide more than adequate heatsinking for head-integrated electronics. Power can be transmitted to photovoltaic cells by lasers with very high efficiency. Lasers for power transmission are located in the drive away from the slider and do not have implications for slider size. Photovoltaic cells for receiving power may be around the size of HAMR laser and will fit in the slider. The transmitting laser power requirements are expected to be no greater than HAMR laser. For example, a 1.7 mW power transfer has been demonstrated for 17 mW input power (efficiency 10%) over 1 m. It is expected that up to 25% efficiency is achievable. For example, electrical to optical power conversion is achieved with laser having typical efficiency of 50%, and optical to electrical power conversion is achieved with photodetector, max efficiency of 53%.

Note that the recording head in these embodiments may provide its own servo control. The recording head may be able to use existing servo control techniques, such as reading magnetic servo marks that are prerecorded onto the disk during manufacture. In other embodiments, the recording head may use an optical slider positioning system, using integrated optical waveguides similar to the HAMR light path. Using these types of waveguides, a precision optical measurement system such as an interferometer may be used to position the recording head over tracks. This device may also read signals patterned on the disk surface (e.g., magnetic patterns) and/or from the rail to determine track location. For example, the head may have a magnetic sensor that reads a track location from a magnetic pattern on the rail.

Figure 8:
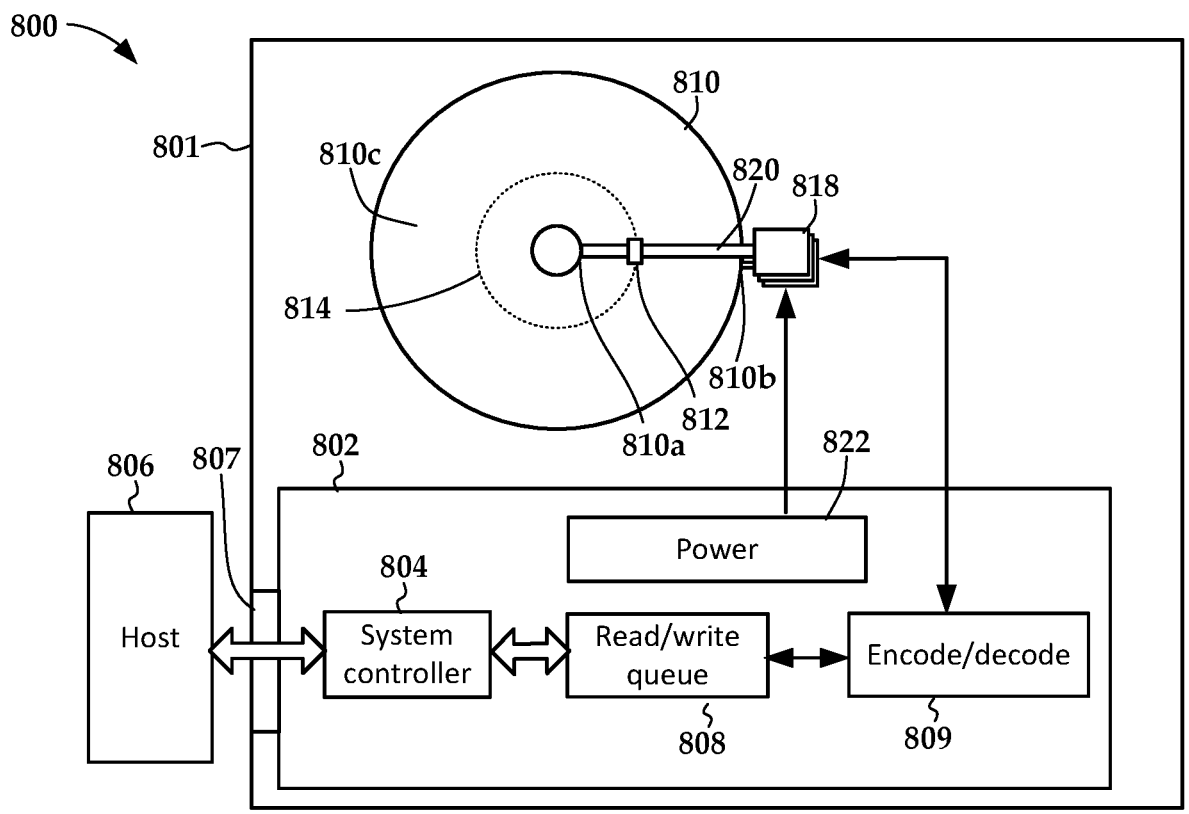
FIG. 8 is a diagram showing a disk drive apparatus according to an example embodiment.

In FIG. 8, a block diagram shows components of a disk drive 800 according to an example embodiment. The disk drive 800 includes an enclosure 801 that may be compatible with standard HDD form factors (e.g., 2.5 inch, 3.5 inch, etc.). The disk drive 800 includes at least one rail 820 extending from an inner diameter 810a to an outer diameter 810b of a surface 810c of a disk 810. One or more recording heads 812 are slidably coupled to the rail 820 and in magnetic communication with the disk surface 810c. The recording heads 812 each include an optical power interface and an optical data interface (see, for example, FIGS. 4 and 7).

The disk drive 800 includes at least one optical transceiver 818 fixably mounted proximate an end of the rail 820 and optically coupled to one or both of the optical power interface and optical data interface of the recording head 812. This optical coupling facilitates one or both of writing data to the disk surface and reading data from the disk surface 810c via the recording head 812. Circuitry 802 of the drive 800 includes a system controller 804 that processes read and write commands and associated data from a host device 806 via host interface 807 (e.g., SATA, SaS, etc.). The host device 806 may include any electronic device that can be communicatively coupled to store and retrieve data from a data storage device, e.g., a computer, peripheral card, etc. The system controller 804 is coupled to a read/write queue 808 that manages data read from and written to the surface of the magnetic disk 810 via the recording heads 812.

The read/write queue 808 generally converts data between the host data format and the format and data communicated to and from recording heads 812. For example, the read/write queue 808 may convert logical block addresses used in the host data requests to physical addresses corresponding to particular locations on tracks 814 of the disk 810. An encoder/decoder section 809 may also be used to convert the data into a format suitable for writing to a magnetic media. The decoding performed by the section 809 may include error correction as known in the art.

The read and write data are communicated from the encoder/decoders 809 to the recording heads 812 via optical transceivers 818. Other data may also be communicated by this path, such as control data causing the heads to move without writing data (e.g., to park the heads), test data for diagnostics and status, etc. The drive circuitry 802 also includes power circuitry 822. This is used to power lasers on the optical transceivers 818 that wirelessly deliver power to the optical power interfaces of the recording heads 812.

Figure 9:
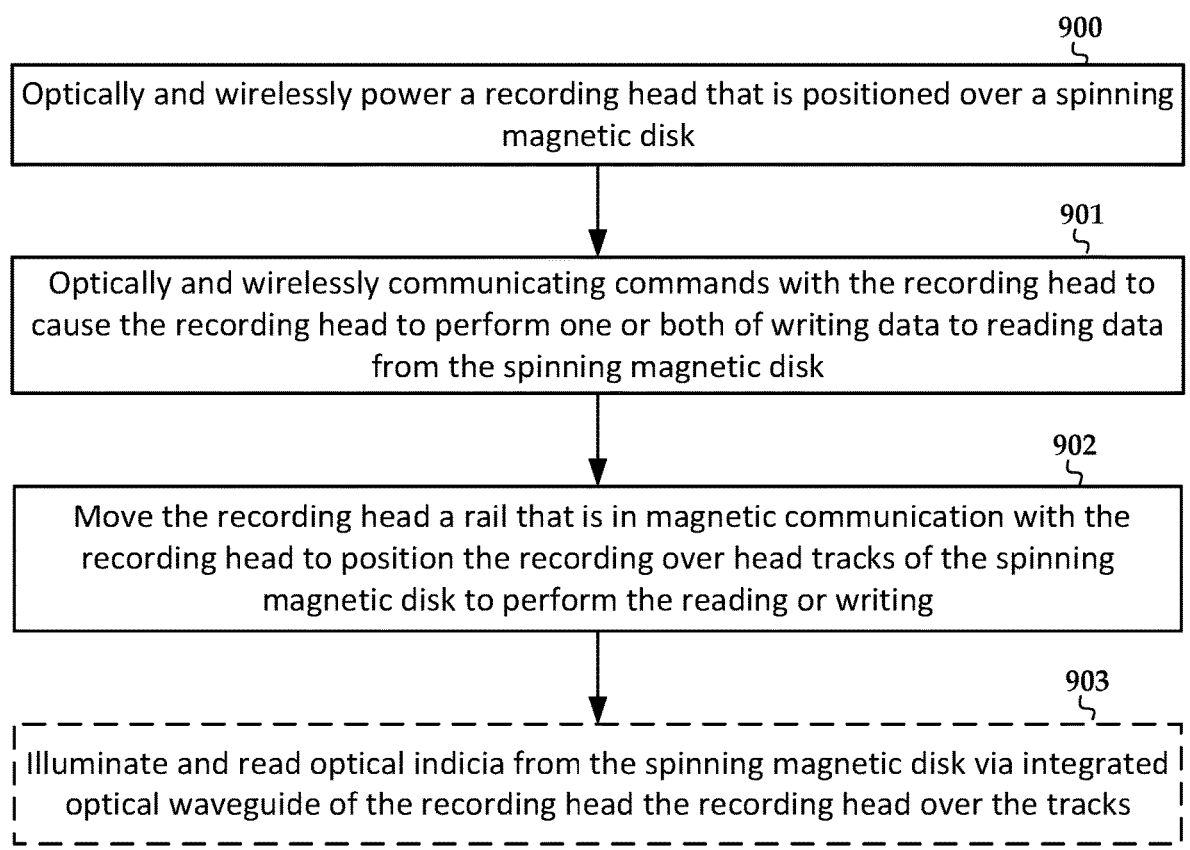
FIG. 9 is a flowchart of a method according to an example embodiment.

In FIG. 9, a flowchart shows a method according to an example embodiment. The method involves optically and wirelessly powering 900 a recording head that is positioned over a spinning magnetic disk. Commands are optically and wirelessly communicated 901 with the recording head to cause the recording head to perform one or both of writing data to reading data from the spinning magnetic disk. The reading may involve amplifying signals received from a read transducer via a read amplifier integrated with the recording head. The writing may involve amplifying signals via a write amplifier integrated with the recording head, the amplified signals being applied to a magnetic write coil and optionally a heat-assisted magnetic recording laser.

In response to the commands, the recording head is caused to move 902 along a rail that is in magnetic communication with the recording head to position the recording head tracks of the spinning magnetic disk. The moving of the recording head along the rail may involve actuating magnetic cores in the recording head, the magnetic cores interacting with permanent magnets arranged in alternate field patterns to cause the recording head to controllably slide along the rail. Optionally, the recording head may illuminate and read 903 optical indicia from the spinning magnetic disk via integrated optical waveguide. The reading of the optical indicia is used to position the recording head over tracks on the spinning disk.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative.

What is claimed is:

1. A disk drive, comprising:
   a rail extending from an inner diameter to an outer diameter of a disk surface;
   a recording head slidably coupled to the rail and in magnetic communication with the disk surface, the recording head comprising an optical power interface and an optical data interface, wherein the rail comprises permanent magnet sections arranged in alternate field patterns, the recording head comprising magnetic cores that are actuated to cause the recording head to controllably slide along the rail; and
   an optical transceiver fixably mounted proximate an end of the rail, the optical transceiver wirelessly and optically coupled to one or both of the optical power interface and the optical data interface of the recording head, thereby facilitating one or both of writing data to the disk surface and reading data from the disk surface via the recording head.

2. The disk drive of claim 1, further comprising:
   a second rail extending from the inner diameter to the outer diameter of the disk surface at a different angular location than the rail;
   a second recording head slidably coupled to the second rail and in magnetic communication with the disk surface, the second recording head comprising a second optical power interface and a second optical data interface; and
   a second optical interface fixably mounted proximate an end of the coupled rail and optically coupled to one or both of the second optical power interface and second optical data interface of the recording head, thereby facilitating one or both of writing data to the disk surface and reading data from the disk surface via the second recording head.

3. The disk drive of claim 1, further comprising:
   a second recording head slidably coupled to the rail and in magnetic communication with the disk surface, the second recording head comprising a second optical power interface and a second optical data interface, wherein the optical interface is optically coupled to one or both of the second optical power interface and second optical data interface of the second recording head, thereby facilitating one or both of writing data to the disk surface and reading data from the disk surface via the second recording head.

4. The disk drive of claim 1, wherein the optical transceiver is fixably mounted proximate an outer diameter of the disk surface, the disk drive further comprising a second optical transceiver fixably mounted proximate a second end of the rail at an inner diameter of the disk, the second optical transceiver optically coupled to one or both of the optical power interface and the optical data interface of the recording head.

5. The disk drive of claim 1, wherein the optical interface is coupled to a system controller, the system controller coupled to a host interface and configured to control the writing data to the disk surface and reading data from the disk surface via the recording head in response to commands received via the host interface.

6. A disk drive, comprising:
a rail extending from an inner diameter to an outer diameter of a disk surface;
a recording head slidably coupled to the rail and in magnetic communication with the disk surface, the recording head comprising an optical power interface and an optical data interface, wherein the recording head comprises permanent magnets and the rail comprises electromagnets that interface with the permanent magnets to cause the recording head to levitate from the rail; and
an optical transceiver fixably mounted proximate an end of the rail, the optical transceiver wirelessly and optically coupled to one or both of the optical power interface and the optical data interface of the recording head, thereby facilitating one or both of writing data to the disk surface and reading data from the disk surface via the recording head.

7. The disk drive of claim 1, further comprising a read amplifier and a write amplifier integrated into the recording head.

8. The disk drive of claim 1, wherein the recording head comprises a heat-assisted magnetic recording head.

9. The disk drive of claim 1, wherein the rail is fixably attached to the disk drive at the outer diameter and unattached to the disk drive at the inner diameter.

10. The disk drive of claim 1, wherein the optical power interface comprises a photovoltaic cell, and wherein the optical transceiver comprises a laser that delivers light energy to the photovoltaic cell.

11. The disk drive of claim 1, wherein the recording head comprises an optical waveguide used as an interferometer to determine a position of the recording head over tracks on the disk surface.

12. A method, comprising:
optically and wirelessly powering a recording head that is positioned over a spinning magnetic disk;
optically and wirelessly communicating commands with the recording head to cause the recording head to perform one or both of writing data to reading data from the spinning magnetic disk; and
in response to the commands, causing the recording head to move along a rail that is in magnetic communication with the recording head to position the recording head over tracks of the spinning magnetic disk to perform one or both of the writing and the reading.

13. The method of claim 12, wherein the reading data from the recording head comprises amplifying signals received from a read transducer via a read amplifier integrated with the recording head.

14. The method of claim 12, wherein the writing data to the recording head comprises amplifying signals via a write amplifier integrated with the recording head, the amplified signals being applied to a magnetic write coil.

15. The method of claim 14, wherein the amplified signals are further applied to a heat-assisted magnetic recording laser.

16. The method of claim 12, wherein the causing of the recording head to move along the rail comprises actuating magnetic cores in the recording head, the magnetic cores interacting with permanent magnets arranged in alternate field patterns to cause the recording head to controllably slide along the rail.

17. The method of claim 12, further comprising using an optical interferometer integrated in the recording head to position the recording head over the tracks on the spinning disk.

18. The disk drive of claim 6, wherein the optical transceiver is fixably mounted proximate an outer diameter of the disk surface, the disk drive further comprising a second optical transceiver fixably mounted proximate a second end of the rail at an inner diameter of the disk, the second optical transceiver optically coupled to one or both of the optical power interface and the optical data interface of the recording head.

19. The disk drive of claim 6, wherein the optical power interface comprises a photovoltaic cell, and wherein the optical transceiver comprises a laser that delivers light energy to the photovoltaic cell.

20. The disk drive of claim 6, wherein the recording head comprises an optical waveguide used as an interferometer to determine a position of the recording head over tracks on the disk surface.

* * * * *